United States Patent
Hames et al.

(10) Patent No.: US 10,189,570 B2
(45) Date of Patent: Jan. 29, 2019

(54) SEAT PAN ASSEMBLY WITH ENCASED COMFORT SPRING

(71) Applicant: B/E Aerospace, Inc., Wellington, FL (US)

(72) Inventors: Sean E. Hames, Weston, FL (US); Catalin Bunea, Miramar, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 90 days.

(21) Appl. No.: 14/863,819

(22) Filed: Sep. 24, 2015

(65) Prior Publication Data

US 2016/0083097 A1    Mar. 24, 2016

Related U.S. Application Data

(60) Provisional application No. 62/054,674, filed on Sep. 24, 2014.

(51) Int. Cl.
| | | |
|---|---|---|
| *A47C 7/20* | (2006.01) | |
| *B64D 11/06* | (2006.01) | |
| *A47C 7/30* | (2006.01) | |
| *B60N 2/70* | (2006.01) | |

(52) U.S. Cl.
CPC ............ *B64D 11/0647* (2014.12); *A47C 7/20* (2013.01); *A47C 7/30* (2013.01); *B60N 2/7094* (2013.01); *Y02T 50/46* (2013.01)

(58) Field of Classification Search
USPC .......................... 297/452.55, 452.52, 452.53
See application file for complete search history.

(56) References Cited

U.S. PATENT DOCUMENTS

| | | | | |
|---|---|---|---|---|
| 3,329,466 A | * | 7/1967 | Getz | A47C 7/20 267/111 |
| 3,363,943 A | * | 1/1968 | Getz | A47C 7/20 267/110 |
| 3,529,866 A | * | 9/1970 | Getz | B60N 2/707 297/452.26 |
| 3,630,572 A | * | 12/1971 | Homier | A47C 7/18 297/218.1 |
| 3,649,077 A | * | 3/1972 | Flint | A47C 7/30 267/110 |

(Continued)

FOREIGN PATENT DOCUMENTS

| | | |
|---|---|---|
| DE | 102006045957 A1 | 4/2008 |
| WO | 88/09731 A1 | 12/1988 |

OTHER PUBLICATIONS

International Search Report and Written Opinion of corresponding International Application No. PCT/US2015/051885; dated Dec. 23, 2015; 9 pages.

*Primary Examiner* — Kyle J. Walraed-Sullivan
(74) *Attorney, Agent, or Firm* — Clements Bernard Walker PLLC

(57) ABSTRACT

A seat pan assembly including spaced left and right seat spreaders and a seat cushion assembly supported on the spaced left and right spreaders, the seat cushion assembly including a spring assembly incorporated within at least one layer of seat foam. A seat cushion assembly including at least one layer of seat foam and a spring assembly having a plurality of springs incorporated into the at least one layer of seat foam such that portions of the at least one layer of seat foam are positioned both above and below the plurality of springs.

8 Claims, 6 Drawing Sheets

(56) References Cited

U.S. PATENT DOCUMENTS

| | | | | | |
|---|---|---|---|---|---|
| 3,656,807 A * | 4/1972 | Arida | B60N 2/7058 | | |
| | | | 297/452.26 | | |
| 3,669,498 A * | 6/1972 | Meyers | A47C 7/18 | | |
| | | | 297/452.53 | | |
| 3,840,269 A * | 10/1974 | Ambrose | A47C 7/20 | | |
| | | | 264/46.4 | | |
| 3,848,926 A * | 11/1974 | Kuroishi | B60N 2/7058 | | |
| | | | 297/452.26 | | |
| 3,851,920 A * | 12/1974 | Harris | A47C 3/12 | | |
| | | | 297/440.22 | | |
| 3,853,352 A * | 12/1974 | Ambrose | A47C 7/20 | | |
| | | | 297/452.57 | | |
| 3,880,467 A * | 4/1975 | Tischler | A47C 7/20 | | |
| | | | 297/452.53 | | |
| 3,994,482 A * | 11/1976 | Platt | A47C 7/287 | | |
| | | | 267/102 | | |
| 4,043,544 A * | 8/1977 | Ismer | A47C 7/20 | | |
| | | | 267/145 | | |
| 4,075,722 A * | 2/1978 | Rinard | A47C 7/20 | | |
| | | | 297/452.53 | | |
| 4,191,424 A * | 3/1980 | Mundell | A47C 7/20 | | |
| | | | 297/452.26 | | |
| 4,396,225 A * | 8/1983 | Crosby | A47C 7/025 | | |
| | | | 297/452.52 | | |
| 4,558,905 A * | 12/1985 | Natori | A47C 7/748 | | |
| | | | 297/452.6 | | |
| 4,606,532 A * | 8/1986 | Kazaoka | A47C 7/282 | | |
| | | | 267/102 | | |
| 4,636,006 A * | 1/1987 | Kazaoka | B60N 2/72 | | |
| | | | 267/142 | | |
| 4,682,763 A * | 7/1987 | Kazaoka | B60N 2/72 | | |
| | | | 267/144 | | |
| 4,699,427 A * | 10/1987 | Kobayashi | B29D 99/0092 | | |
| | | | 297/452.27 | | |
| 4,747,638 A * | 5/1988 | Saito | B60N 2/58 | | |
| | | | 297/452.35 | | |
| 4,795,215 A * | 1/1989 | Shimada | B60N 2/5875 | | |
| | | | 297/452.61 | | |
| 4,813,738 A * | 3/1989 | Ito | B60N 2/5685 | | |
| | | | 219/217 | | |
| 4,840,430 A * | 6/1989 | Shimada | B29D 99/0092 | | |
| | | | 156/212 | | |
| 4,865,379 A * | 9/1989 | Aoki | B60N 2/5685 | | |
| | | | 297/180.12 | | |
| 4,883,320 A * | 11/1989 | Izumida | A47C 7/282 | | |
| | | | 297/452.56 | | |
| 5,085,487 A * | 2/1992 | Weingartner | B60N 2/00 | | |
| | | | 297/452.1 | | |
| 5,283,918 A * | 2/1994 | Weingartner | A47C 7/20 | | |
| | | | 297/281 | | |
| 5,328,248 A * | 7/1994 | Nishiyama | B60N 2/071 | | |
| | | | 297/452.18 | | |
| 5,405,178 A * | 4/1995 | Weingartner | B29D 99/0092 | | |
| | | | 297/452.1 | | |
| 5,485,976 A * | 1/1996 | Creed | B64D 11/06 | | |
| | | | 244/118.6 | | |
| 5,564,144 A * | 10/1996 | Weingartner | A47C 7/26 | | |
| | | | 297/452.27 | | |
| 5,669,799 A * | 9/1997 | Moseneder | A47C 7/18 | | |
| | | | 297/452.48 | | |
| 5,747,140 A * | 5/1998 | Heerklotz | A47C 27/144 | | |
| | | | 248/630 | | |
| 5,769,491 A * | 6/1998 | Schwarzbich | B60N 2/667 | | |
| | | | 24/339 | | |
| 5,788,332 A * | 8/1998 | Hettinga | B60N 2/7017 | | |
| | | | 297/452.55 | | |
| 5,971,432 A * | 10/1999 | Gagnon | B60N 2/002 | | |
| | | | 180/268 | | |
| 6,116,694 A * | 9/2000 | Bullard | A47C 7/287 | | |
| | | | 267/87 | | |
| 6,158,815 A * | 12/2000 | Sugie | A47C 7/282 | | |
| | | | 297/452.49 | | |
| 6,170,915 B1 * | 1/2001 | Weisz | A47C 7/35 | | |
| | | | 267/87 | | |
| 6,361,117 B1 * | 3/2002 | Tate | A47C 7/282 | | |
| | | | 297/452.56 | | |
| 6,378,948 B1 * | 4/2002 | Macher | A47C 7/425 | | |
| | | | 297/180.12 | | |
| 6,652,034 B1 * | 11/2003 | Schramm | A47C 7/185 | | |
| | | | 297/452.29 | | |
| 6,676,218 B2 * | 1/2004 | Fujita | B60N 2/5891 | | |
| | | | 297/452.49 | | |
| 6,773,069 B1 * | 8/2004 | Kaneko | B60N 2/1615 | | |
| | | | 297/344.15 | | |
| 6,786,544 B1 * | 9/2004 | Muraishi | B60N 2/36 | | |
| | | | 297/216.14 | | |
| 6,793,289 B2 * | 9/2004 | Kuster | B60N 2/449 | | |
| | | | 267/87 | | |
| 7,287,812 B2 * | 10/2007 | Ishima | B60N 2/5635 | | |
| | | | 297/180.14 | | |
| 7,837,273 B1 * | 11/2010 | Ratza | B60N 2/24 | | |
| | | | 297/452.49 | | |
| 7,850,247 B2 * | 12/2010 | Stauske | B60N 2/5621 | | |
| | | | 297/452.24 | | |
| 8,042,874 B2 * | 10/2011 | Livengood | B60N 2/58 | | |
| | | | 297/452.58 | | |
| 8,136,884 B2 * | 3/2012 | Bullard | D04B 21/18 | | |
| | | | 267/110 | | |
| 8,147,001 B2 * | 4/2012 | Boren | B64D 11/06 | | |
| | | | 297/216.1 | | |
| 8,684,462 B2 * | 4/2014 | Brewer | B60N 2/0232 | | |
| | | | 297/344.17 | | |
| 2001/0037692 A1 * | 11/2001 | Anahid | G01G 19/4142 | | |
| | | | 73/862.627 | | |
| 2002/0096932 A1 * | 7/2002 | Fujita | B60N 2/58 | | |
| | | | 297/452.56 | | |
| 2003/0006640 A1 * | 1/2003 | Yasuda | A47C 1/02 | | |
| | | | 297/452.35 | | |
| 2003/0052526 A1 * | 3/2003 | Crosby | A47C 7/30 | | |
| | | | 297/452.52 | | |
| 2004/0012238 A1 * | 1/2004 | Zenba | B60N 2/70 | | |
| | | | 297/452.27 | | |
| 2004/0145230 A1 * | 7/2004 | Fujita | A47C 31/006 | | |
| | | | 297/452.27 | | |
| 2005/0104422 A1 * | 5/2005 | Okamoto | B60N 3/102 | | |
| | | | 297/188.11 | | |
| 2005/0231010 A1 * | 10/2005 | Nagayama | A47C 7/02 | | |
| | | | 297/216.1 | | |
| 2006/0103214 A1 * | 5/2006 | Andersson | B60N 2/7047 | | |
| | | | 297/378.13 | | |
| 2006/0152063 A1 * | 7/2006 | Nagayama | B60N 2/1615 | | |
| | | | 297/452.49 | | |
| 2006/0170272 A1 * | 8/2006 | Mohn | A47C 7/30 | | |
| | | | 297/452.6 | | |
| 2007/0126274 A1 * | 6/2007 | Takahashi | B60H 3/00 | | |
| | | | 297/452.21 | | |
| 2007/0241604 A1 * | 10/2007 | Saitou | B60N 2/5621 | | |
| | | | 297/452.26 | | |
| 2010/0133732 A1 * | 6/2010 | Yamaguchi | B60N 2/002 | | |
| | | | 267/140.4 | | |
| 2012/0019029 A1 * | 1/2012 | Takahashi | B60H 3/00 | | |
| | | | 297/217.1 | | |
| 2012/0061988 A1 * | 3/2012 | Jaranson | B60N 2/643 | | |
| | | | 296/63 | | |
| 2012/0305734 A1 * | 12/2012 | Balin | B60N 2/072 | | |
| | | | 248/430 | | |
| 2014/0225407 A1 * | 8/2014 | Nagayasu | B60N 2/14 | | |
| | | | 297/344.1 | | |
| 2014/0339878 A1 * | 11/2014 | Ogura | B60N 2/66 | | |
| | | | 297/452.48 | | |
| 2015/0042134 A1 * | 2/2015 | Shimizu | B60N 2/66 | | |
| | | | 297/216.14 | | |
| 2017/0086591 A1 * | 3/2017 | Slusher, II | A47C 7/35 | | |

* cited by examiner

SEAT PAN ASSEMBLY WITH ENCASED COMFORT SPRING

CROSS-REFERENCE TO RELATED APPLICATION

This application claims priority from U.S. Application No. 62/054,674 filed Sep. 24, 2014, the contents of which are incorporated by reference herein.

TECHNICAL FIELD AND BACKGROUND OF THE INVENTION

The present invention relates generally to an aircraft seat pan assembly with enhanced comfort, and more particularly, to a seat pan assembly including a variable spring assembly encased at depth within seating foam, wherein the seat pan assembly is customizable for comfort and packaged to provide an easily replaceable unit.

Aircraft seats are required to achieve high levels of performance during crash testing, and therefore incorporate rigid frame members in the seat pan and seat back assemblies capable of withstanding large forces and loads. Rigid frame members are uncomfortable when sat upon, therefore seating surfaces that are in direct contact with a seated passenger are typically padded and upholstered to enhance comfort and reduce fatigue. In the case of the seat pan, to which the present invention is directed, padding is typically provided in the form of combinations of open and closed cell seating foam incorporated into the seat cushion. Foam assemblies can be supported on a rigid base that can be separate from or attached thereto. Instead of seating foam, the seat pan can also include a spring assembly that spans between the main seat pan spreaders.

In the case of a spring assembly, the springs are attached to the main seat frame members such that they span therebetween. In this arrangement, the springs cannot be replaced without disassembling or replacing the entire seat pan assembly. Conventional spring assemblies are also typically "one-size-fits-all," and therefore are not variable to customize the overall comfort of the seat.

Accordingly, what is needed is a customizable seat pan assembly that incorporates a spring assembly in a manner such that the spring assembly is readily replaceable without major maintenance and cost.

BRIEF SUMMARY OF THE INVENTION

It is therefore an object of the invention to provide a seat pan assembly that incorporates a spring assembly therein.

It is another object of the invention to provide a seat pan assembly that incorporates a spring assembly therein in a manner that makes possible replacement of the spring assembly without having to disassemble the entire seat pan, or a major portion thereof.

It is another object of the invention to incorporate a spring assembly, at depth, into seat foam of a seat pan.

It is another object of the invention to provide an independent spring assembly configured to be incorporated into or encased at depth within seat foam in a seat pan.

It is another object of the invention to incorporate a spring assembly into a seat pan without having to attach the spring assembly or the springs thereof to main seat frame members.

To achieve the foregoing and other objects and advantages, the present invention provides in a first embodiment a seat pan assembly including spaced left and right seat spreaders, and a seat cushion assembly supported on the spaced left and right spreaders, the seat cushion assembly including a spring assembly incorporated within at least one layer of seat foam.

In another aspect, the spring assembly may be free from attachment to the spaced left and right seat spreaders.

In yet another aspect, the at least one layer of seat foam may include a layer of closed-cell foam, a layer of open-cell foam, and flotation foam distributed throughout the layer of open-cell foam.

In yet another aspect, the spring assembly may include a plurality of springs supported above and spaced apart from a base such that space is provided between the plurality of springs and the base for positioning the at least one layer of seat foam therein.

In yet another aspect, the at least one layer of seat foam may include a bottom layer of closed-cell foam and a top layer of open cell foam.

In yet another aspect, the bottom layer of closed-cell foam may be positioned directly below the plurality of springs of the spring assembly, and the top layer of open-cell foam may be positioned directly above the plurality of springs of the spring assembly.

In yet another aspect, a density of the top layer of open-cell foam positioned directly above the plurality of springs may be less than a density of the closed-cell foam positioned directly below the plurality of springs.

In yet another aspect, the spring assembly may further include upwardly-extending sidewalls extending along opposing ends of the base, and wherein loops are formed along a top edge of each of the sidewalls for capturing ends of the plurality of springs.

In yet another aspect, the spring assembly may be encased at depth within the at least one layer of seat foam.

In another embodiment, the present invention provides a seat cushion assembly configured to be incorporated into a seat pan assembly, the seat cushion assembly including at least one layer of seat foam and a spring assembly having a plurality of springs incorporated into the at least one layer of seat foam such that a portion of the at least one layer of seat foam is positioned above the plurality of springs and a portion of the at least one layer of seat foam is positioned below the plurality of springs.

In another aspect, the at least one layer of seat foam may include a layer of closed-cell foam positioned below the plurality of springs and a layer of open-cell foam positioned above the plurality of springs.

In yet another aspect, the plurality of springs may be supported above and spaced apart from a base such that space is provided between the plurality of springs and the base for positioning at least a portion of the at least one layer of seat foam therein.

In yet another aspect, the spring assembly may include upwardly-extending sidewalls extending along opposing ends of the base, and wherein loops are formed along a top edge of each of the sidewalls for capturing ends of the plurality of springs.

In yet another aspect, a density of the at least one layer of seat foam positioned below the plurality of springs may be greater than a density of the at least one layer of seat foam positioned above the plurality of springs.

In yet another aspect, the spring assembly may be encased at depth within the at least one layer of seat foam.

In yet another aspect, the seat cushion assembly may further include a rigid bottom panel.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, the present invention provides a seat pan assembly or "seat bottom" with enhanced comfort suitable for incorporation into a passenger seat in an airliner or other conveyance. Although only the seat pan portion of the seat is shown throughout the figures, it is easily understood by one skilled in the art that the seat pan is of the type configured to pivotally attach at the rearward end thereof to a reclining seatback typically found in an aircraft seat, and can pivotally attach at the forward end thereof to a deployable legrest. The seat pan is thus compatible with a variety of different seat types, designs and configurations. It is also easily understood by one skilled in the art that the seat pan is configured to be supported from below by one or more seat legs, frame members and/or transverse beam tubes.

Figure 1:
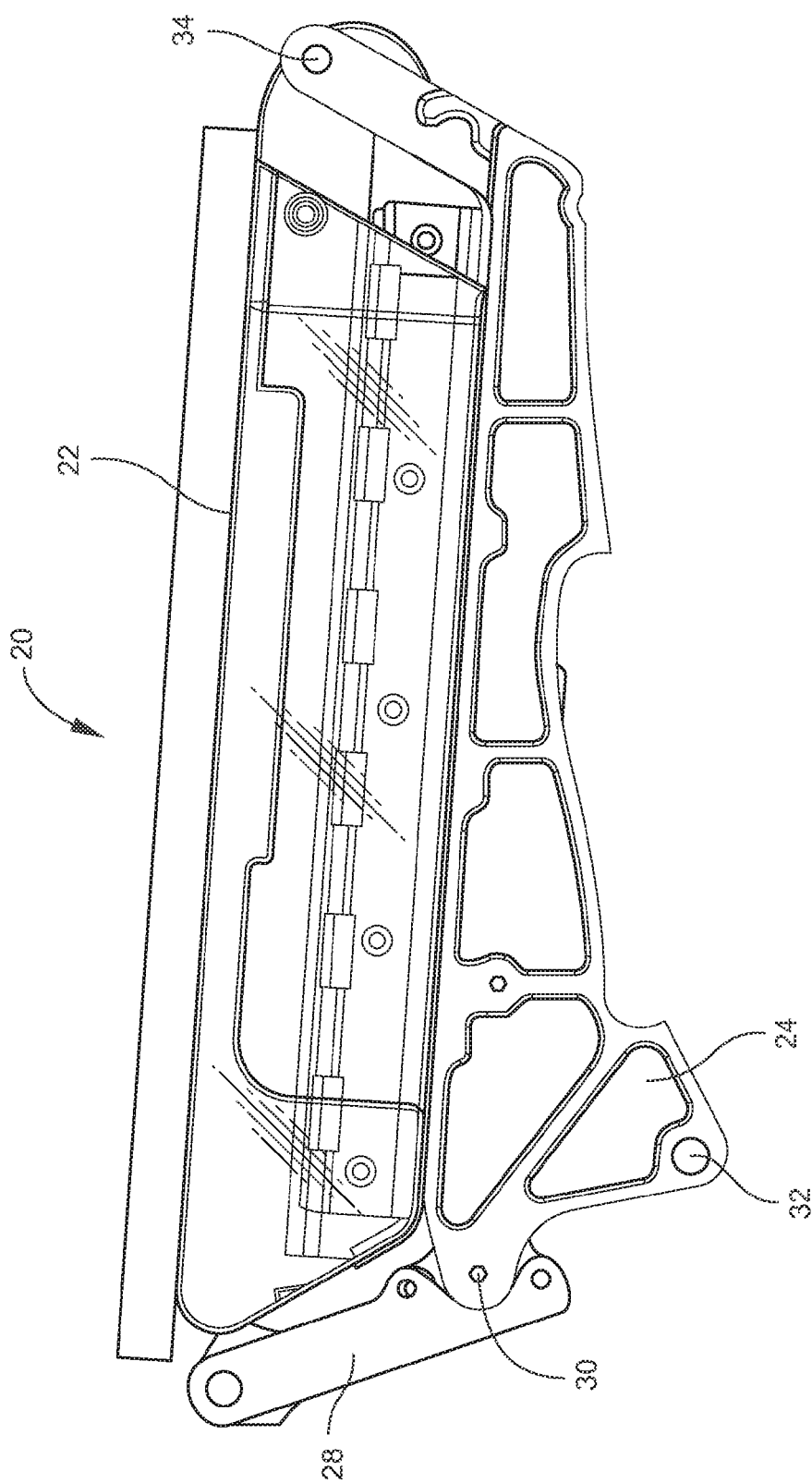
FIG. 1 is a side elevation view of a seat pan assembly according to an embodiment of the invention.
Figure 2:
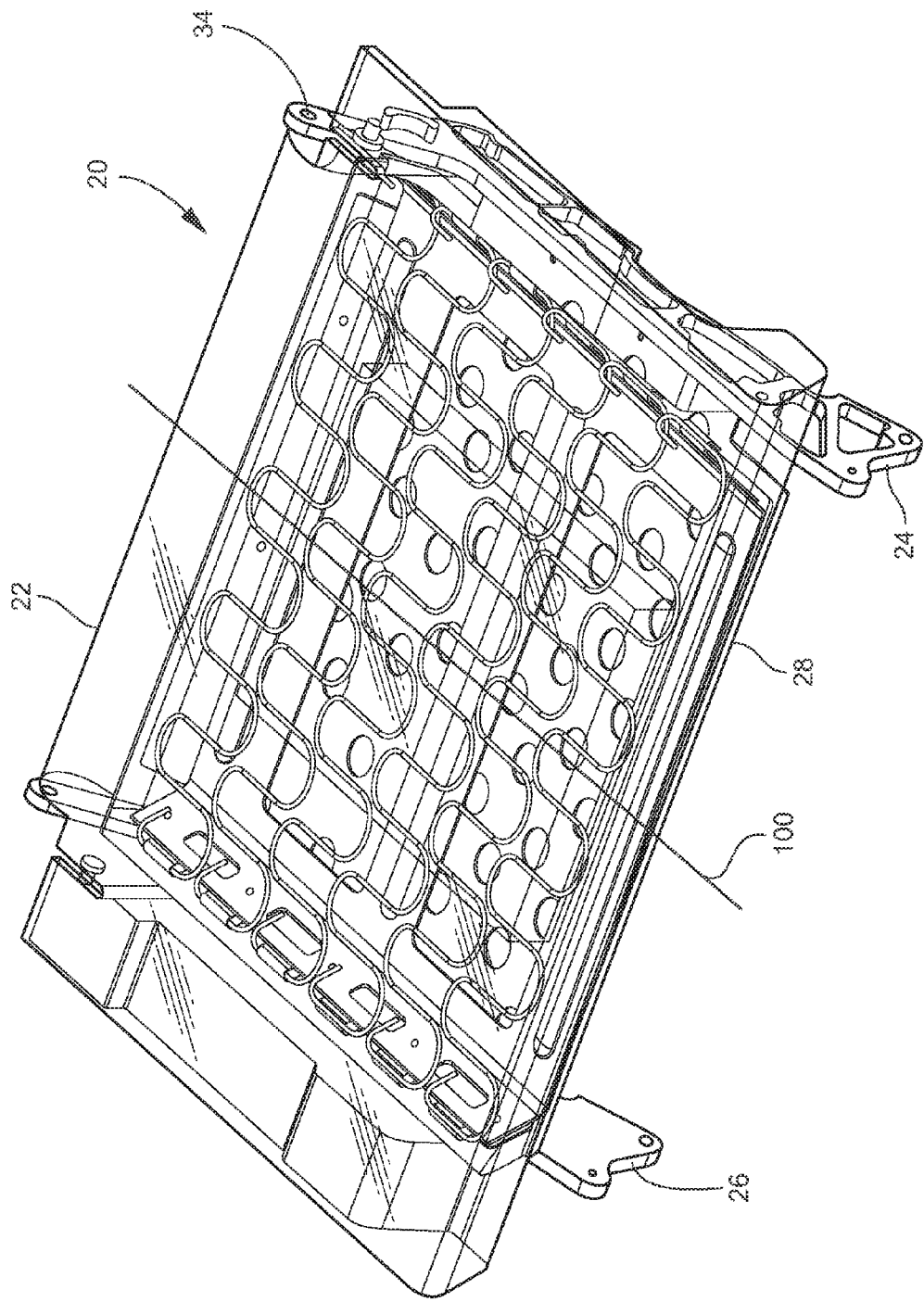
FIG. 2 is a top perspective view of the seat pan assembly of FIG. 1.
Figure 3:
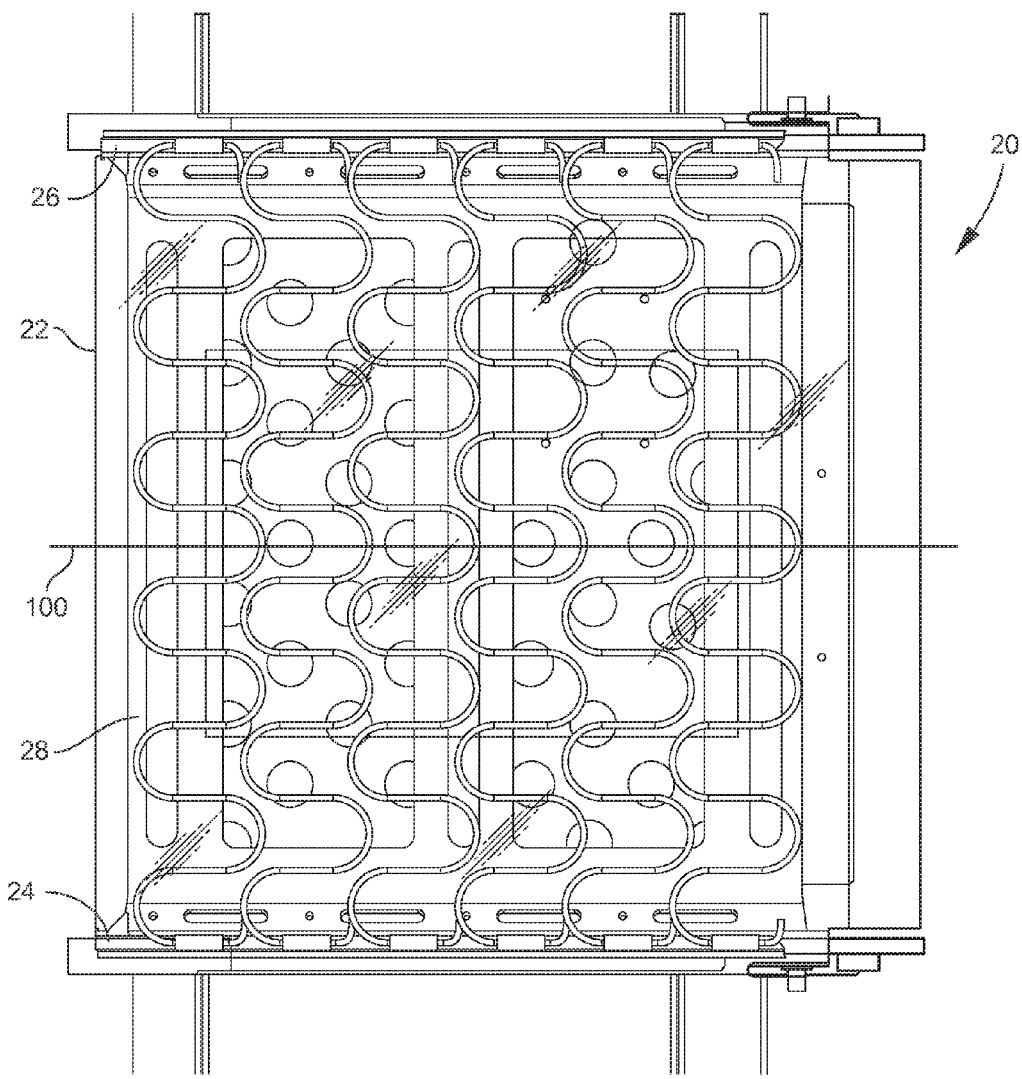
FIG. 3 is a top plan view of the seat pan assembly of FIG. 1.

FIGS. 1-3 show the seat pan assembly according to the present invention generally at reference numeral 20. The seat pan assembly 20 generally includes a seat cushion assembly 22 supported by spaced left and right seat spreaders 24, 26. The seat spreaders 24, 26 are rigid frame members that provide the main structural support to the seat pan. The "forward" end of the seat pan assembly 20, to which a deployable leg rest can attach, is shown on the left-hand side of FIG. 1, while the "rearward" end of the seat pan assembly, to which a reclining seat back can attach, is shown on the right-hand side of FIG. 1. As shown, the seat pan assembly 20 is inclined in the direction of the forward end for comfort and to provide a cradled sitting position.

The seat spreaders 24, 26 may be interconnected through a forward frame member 28 oriented transverse to the longitudinal seat axis indicated at reference numeral 100 in FIGS. 2 and 3. The forward frame member 28 can serve to interconnect the seat spreaders 24, 26 to provide support and maintain squareness of the seat pan. The forward frame member 28 can also serve to seat, conceal and protect the forward end of the seat cushion assembly 22. One or more of the top, bottom, side, front and rear portions of the seat pan assembly 20 can be concealed beneath upholstery for added comfort and aesthetics, and the seat pan assembly may serve to provide the attachment points for the upholstery.

The seat spreaders 24, 26 as shown define three attachment points, which in a specific embodiment can be pivotal attachment points. The first attachment point, indicated at reference numeral 30, serves to attach the forward frame member 28 to the seat spreaders 24, 26. The second attachment point, indicated at reference numeral 32, can be used to attach the seat pan assembly 20 to a fixed frame member, seat leg, transverse beam, movable frame member, etc., generally supporting the seat pan assembly 20 in a position elevated above the deck. The third attachment point, indicated at reference numeral 34, is used to pivotally attach the rearward end of the seat spreaders 22, 24 to a seat back assembly (not shown). In a particular embodiment, the seat cushion assembly 22 can be pivotally attached to the spaced spreaders 24, 26 at attachment point 34 such that the seat cushion assembly 22 can be lifted at the forward end thereof and rotated upward for maintenance and/or to provide access under the seat. While only certain rigid seat pan frame members are shown throughout the figures, it is envisioned that the seat pan can include additional frame members such as transverse frame members and/or beams.

Figure 4:
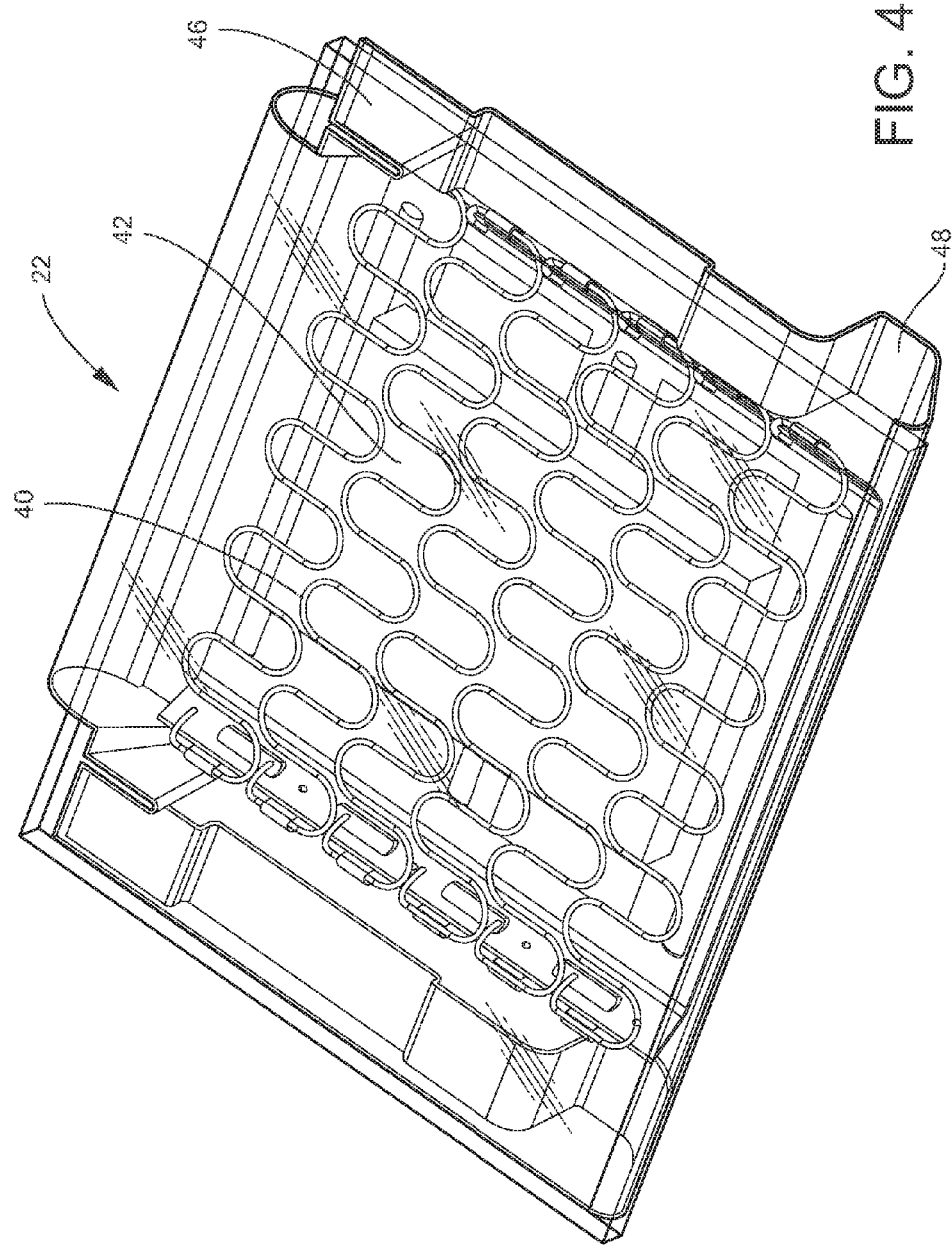
FIG. 4 is a top perspective view of the seat cushion assembly incorporating a spring assembly therein.
Figure 5:
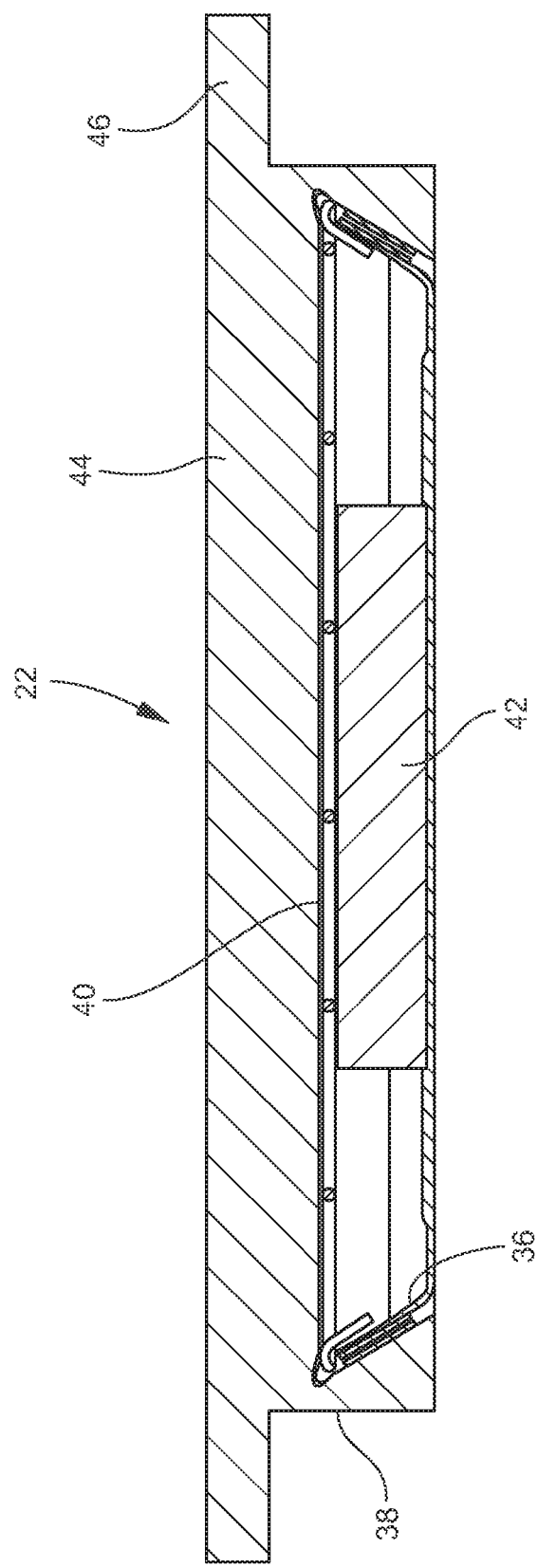
FIG. 5 is a sectional view through the seat cushion assembly of FIG. 4.

FIGS. 4 and 5 are respective perspective and sectional views of the seat cushion assembly 22 shown apart from the structural seat pan frame members. The seat cushion assembly 22 generally includes a spring assembly 36 encased at depth within one or more layers of seating foam 38. The seating foam may be provided as separate "layers" arranged vertically above and/or below the springs 40 of the spring assembly 36. As shown, a first or "lower" layer of seating foam 42 is positioned vertically below or underlying the springs 40 in the general area of the posterior of the passenger. The first layer of seating foam 42 can include, but is not limited to, high density foam such as closed-cell foam. As show, the first layer of seating foam 42 can be provided as a single rectangular-shaped cushion positioned directly below the springs 40 in the area of principal contact with the seat occupant. As such, higher density foam may be strategically positioned in the area of the seat pan most likely to be the principal contact area or support the majority of the weight of the seat occupant, while seat foam densities can be relaxed outside of the principal contact area.

A second or "upper" layer of seating foam, indicated generally at reference numeral 44, is provided above the springs 40, and may be provided to the sides of the spring assembly 36 and in the area below the springs 40 not occupied by the first layer of the seating foam 38. In this arrangement, foam can be provided both vertically above and below the springs 40, thereby encasing the springs 40 at depth within the seating foam 38. The second foam layer 44 can include one or more of open-cell foam and flotation foam, wherein at least the open-cell foam has resilient characteristics for cushioning and recovery against repeated impacts. The seat cushion assembly 22 can include additional layers such as adhesive layers, insulating layers and fire blocking layers and/or coatings. One example of open-cell foam includes polyurethane foam for softness and comfort.

The depth (i.e., vertical position) of the spring assembly 36 and springs 40 along the vertical profile of the seating foam may be varied to customize overall comfort and spring effect of the assembly. The types of materials used in the first and second foam layers 42, 44 can also be varied to customize seating comfort. For example, foam density may be the same or vary between the layers to modify comfort levels to a desired configuration as well as introduce a vertical compressibility profile into the seat cushion assembly 22. In a specific embodiment, the entire spring assembly 36 can be embedded within the layers of seating foam.

The seat cushion assembly 22 may further include a top cover layer 46, which can be one or more of an additional cushion layer, upholstery layer, fire-blocking layer, etc. The cover layer 46 may span substantially the entire surface area of the top of the cushion assembly 22. The entire seat cushion assembly 22 may be supported on a separate, or incorporated, rigid bottom panel 48 that seats upon and engages with the seat spreaders 24, 26. As shown, the bottom panel 48 has a profile that follows the shape of the seat spreaders 24, 26 to firmly and stably seat the seat cushion assembly 22 on the spreaders.

Figure 6:
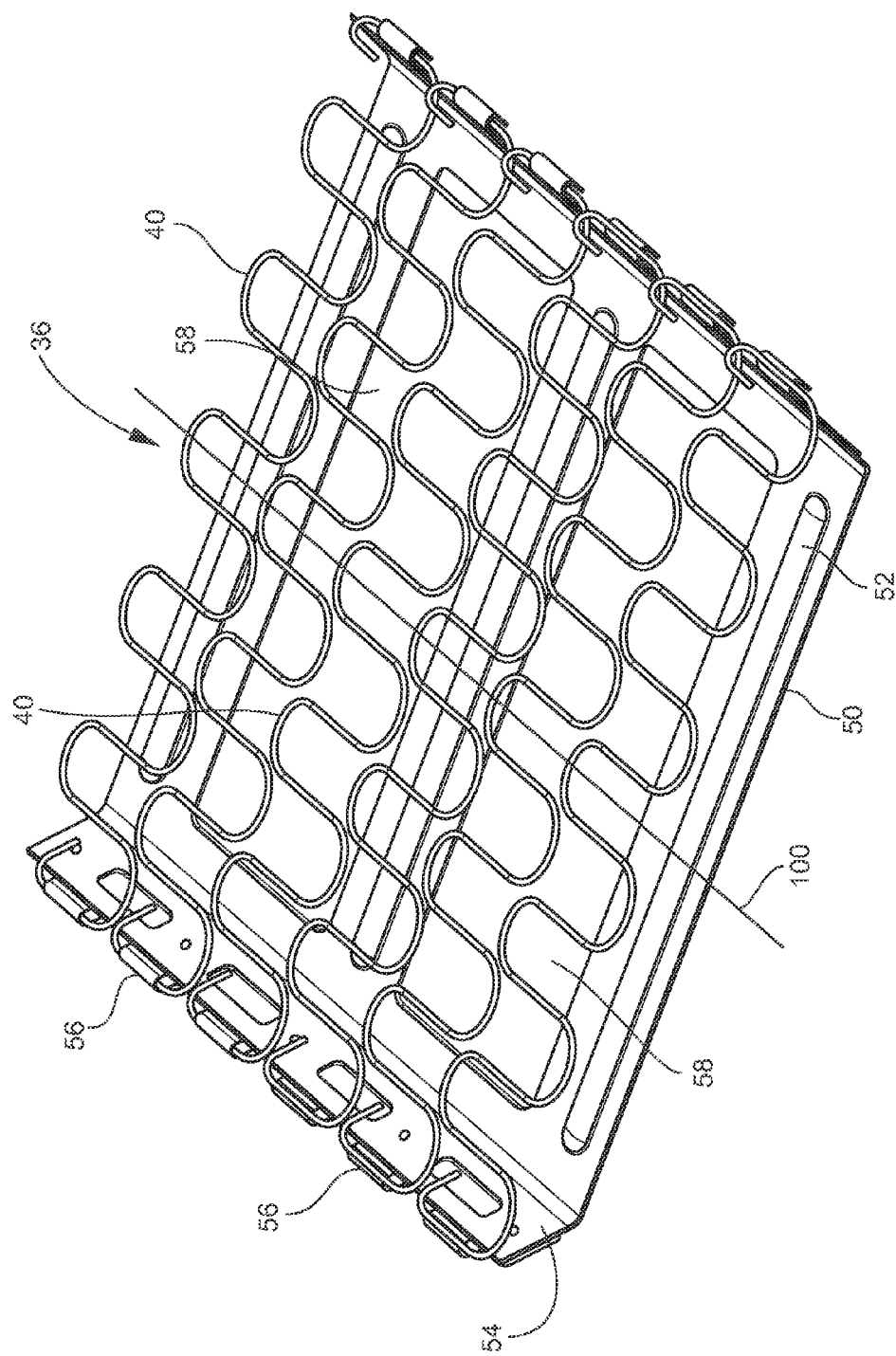
FIG. 6 is a top perspective view of the spring assembly.

FIG. 6 shows the spring assembly 36 according to a preferred embodiment of the invention. The spring assembly 36 generally includes a plurality of parallel sinuous wire springs 40 supported in an elevated position above an underlying spring frame 50 such that space is provided between the spring frame and the springs for positioning at least the first layer of seating foam 42. The spring frame 50 includes a substantially flat base 52 having sidewalls 54 that extend upwardly at an angle to the base, for example, at about a 45 degree angle thereto. The springs 40 attach to the sidewalls 54 along the top edge thereof. As shown, ends of the springs 40 are captured by loops 56 formed along the top edge of the sidewalls, and the springs are evenly spaced part in the direction along the longitudinal seat axis 100.

It is envisioned that the springs may be otherwise attached to the spring frame 50, for example, by welding. The spring frame 50 further defines openings 58 through the flat base 52 for reducing the overall weight of the assembly. The springs 40 may be interconnected using stringers to stabilize lateral movement thereof and prevent twisting under loading. The springs 40 may have a shape other than sinusoidal, and the spring assembly 36 can include any number of springs, arrangement and spring gauge.

The seat cushion assembly 22 having the spring assembly 36 incorporated therein makes possible the ability to remove the entire assembly from the seat pan without having to detach the springs from the seat spreaders 24, 26 or other seat pan frame member. As such, the seat cushion assembly 22 can be removed and replaced without disassembling the entire seat pan, and one seat cushion assembly can be replaced with another, different seat cushion assembly having a different spring load to customize the seat pan and spring effect.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A seat pan assembly, comprising:
   spaced seat spreaders;
   at least one transverse frame member affixed between the spaced seat spreaders; and
   a seat cushion assembly disposed between the spaced seat spreaders and atop and supported on the at least one transverse frame member, the seat cushion assembly comprising:
   a spring assembly disposed at depth within a foam assembly and free of attachment to the spaced seat spreaders and the at least one transverse frame member, the spring assembly comprising a frame having a base and sidewalls extending upwardly at an obtuse angle to the base, and a plurality of springs affixed along a top of the sidewalls and extending between the sidewalls elevated above the base;
   the foam assembly comprising a first layer of foam disposed within the spring assembly between the plurality of springs and the base;
   the foam assembly further comprising a second layer of foam, having a different density than the first layer of foam, encasing at depth the spring assembly within the seat cushion assembly, the second layer of foam continuous along opposing outer sides and a top of the spring assembly; and
   a rigid bottom panel pivotally attached at one end to the spaced seat spreaders, the rigid bottom panel disposed atop and supported on the spaced seat spreaders.

2. The seat pan assembly of claim 1, wherein the first layer of foam is closed-cell foam.

3. The seat pan assembly of claim 1, wherein the second layer of foam is open-cell foam.

4. The seat pan assembly of claim 1, wherein the first layer of foam is detached from the second layer of foam.

5. The seat pan assembly of claim 1, wherein the density of the first layer of foam is greater than the density of the second layer of foam.

6. The seat pan assembly of claim 1, wherein a plurality of loops are provided along a top edge of each of the sidewalls of the spring assembly, and each end of the plurality of springs is engaged in a respective one of the plurality of loops.

7. The seat pan assembly of claim 1, wherein each of the plurality of springs is a sinusoidal-shaped spring, and the plurality of springs are arranged parallel about a top of the spring assembly.

8. The seat pan assembly of claim 1, wherein the rigid bottom panel has a profile that corresponds to a shape of a portion of the spaced seat spreaders.

* * * * *